United States Patent
Whipps

(10) Patent No.: US 8,833,832 B2
(45) Date of Patent: Sep. 16, 2014

(54) NODE FOR CONNECTING VEHICLE BODY PORTIONS

(75) Inventor: Duncan Whipps, Grosse Pointe Farms, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/210,503

(22) Filed: Aug. 16, 2011

(65) Prior Publication Data

US 2013/0043703 A1 Feb. 21, 2013

(51) Int. Cl.
*B62D 25/08* (2006.01)
*B62D 27/02* (2006.01)
*B62D 25/04* (2006.01)

(52) U.S. Cl.
CPC ............ *B62D 25/082* (2013.01); *B62D 27/023* (2013.01); *B62D 25/04* (2013.01)
USPC ... 296/29; 296/187.09; 296/205; 296/203.02; 296/30

(58) Field of Classification Search
USPC ........ 296/205, 203.1, 203.02, 193.09, 29, 30, 296/146.6, 187.12, 209, 187.09
See application file for complete search history.

(56) References Cited

U.S. PATENT DOCUMENTS

| | | | |
|---|---|---|---|
| 4,988,230 A | 1/1991 | Banthia | |
| 5,226,696 A | 7/1993 | Klages et al. | |
| 5,269,585 A | 12/1993 | Klages | |
| 6,010,182 A | 1/2000 | Townsend | |
| 6,102,605 A | 8/2000 | Emmons | |
| 6,460,918 B1* | 10/2002 | Sato et al. | 296/204 |
| 6,709,047 B2* | 3/2004 | Burge | 296/209 |
| 7,086,686 B2* | 8/2006 | Bullmann et al. | 296/146.6 |
| 7,296,845 B2* | 11/2007 | Seksaria et al. | 296/146.6 |
| 7,322,106 B2 | 1/2008 | Marando | |
| 8,087,714 B2* | 1/2012 | Rouhana et al. | 296/146.6 |
| 8,118,355 B2* | 2/2012 | Tamura et al. | 296/209 |
| 2007/0281523 A1* | 12/2007 | Riley | 439/157 |
| 2008/0061602 A1* | 3/2008 | Czaplicki et al. | 296/205 |
| 2010/0123337 A1* | 5/2010 | Tamura et al. | 296/203.03 |

FOREIGN PATENT DOCUMENTS

GB 2316431 A 2/1998

OTHER PUBLICATIONS

J. Townsend, M. Kaczmar & M. El-Sayed Modular Door System for Side Impact Safety of Motor Vehicles www-nrd.nhtsa.dot.gov/pdf/nrd-01/esv/esv17/proceed/00167.pdf.

* cited by examiner

*Primary Examiner* — Dennis H Pedder
*Assistant Examiner* — Beverly Becker
(74) *Attorney, Agent, or Firm* — L.C. Begin & Associates, PLLC

(57) ABSTRACT

A node is configured for connecting body portions of a vehicle. The node includes a first portion configured for attachment to a first vehicle body portion, and a second portion configured for attachment to a second vehicle body portion.

9 Claims, 4 Drawing Sheets

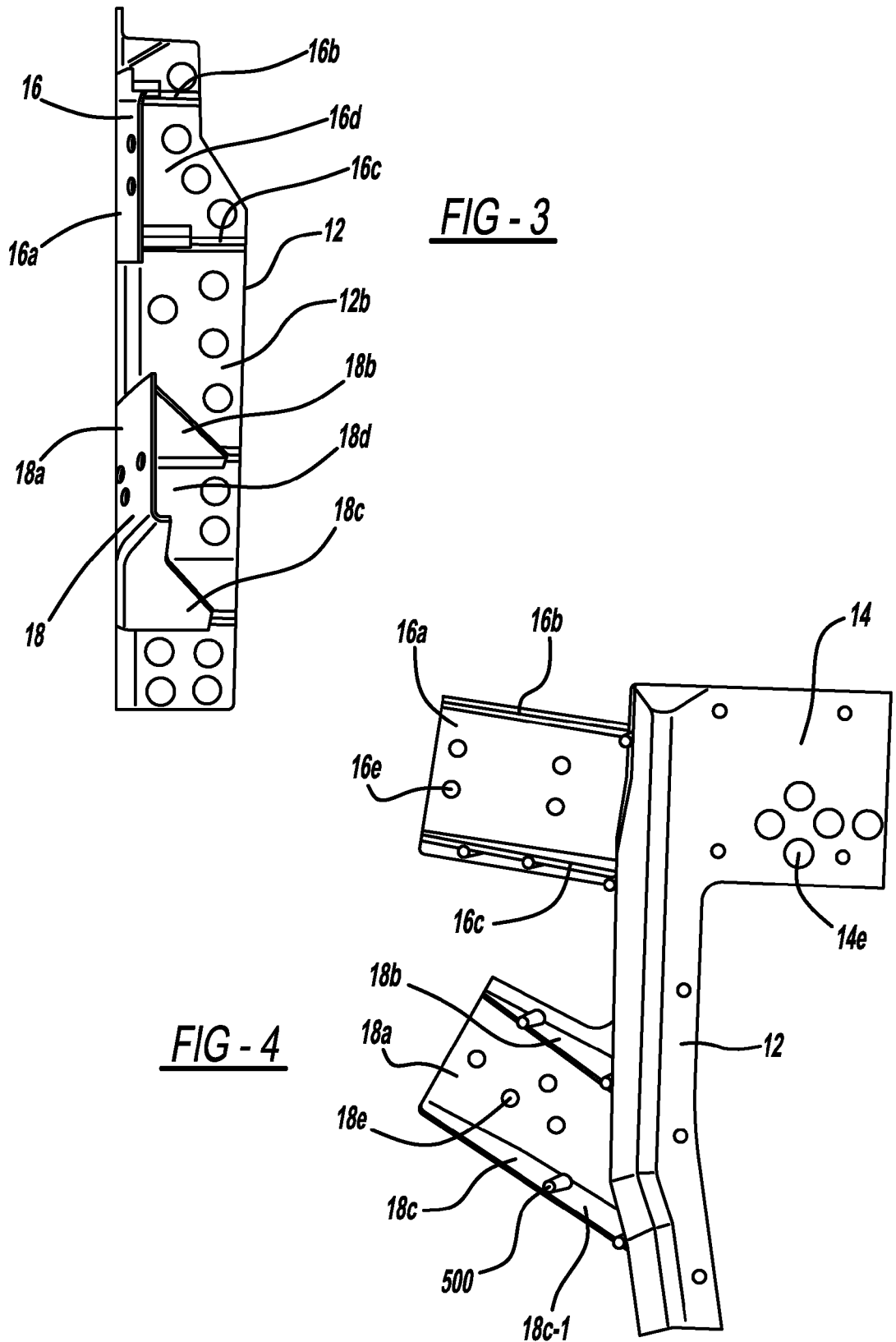

NODE FOR CONNECTING VEHICLE BODY PORTIONS

BACKGROUND OF THE INVENTION

The present invention relates to mechanisms for connecting portions of a body structure of a vehicle.

One type of motor vehicle chassis construction is a "body-on-frame" structure, in which the vehicle body is bolted, welded or otherwise suitably attached to a separate vehicle frame. During the fabrication of such body-on-frame structures, it may be necessary to connect portions of the vehicle body to each other. Also, due to cosmetic, assembly, and vehicle operational considerations (for example, the structures of the parts to be connected, the locations of these parts on the vehicle, and the stresses under which the connections will operate during vehicle use), it may not be feasible to form a direct connection between the body parts along the exterior surfaces of the body parts.

One alternative to connecting the part exteriors is to connect a first vehicle body portion to an interior connection feature formed inside a hollow interior of a second vehicle body portion. However, an opening provided in the second body portion to permit insertion of the first body portion therein may also permit entry of noise, dirt and moisture into the second body portion interior. To prevent this, it may be necessary to seal the portion of the opening not occupied by the first body portion. However, this can increase the cost of assembly and the time required for assembly. It may also be difficult to weld or fasten the part of the first body portion residing within the second body portion interior. Thus, a need exists for a method of connecting body portions of a vehicle without requiring that an opening be provided into a body portion interior.

SUMMARY OF THE INVENTION

In one aspect of the embodiments of the present invention, a node configured for connecting body portions of a vehicle is provided. The node includes a first portion configured for attachment to a first vehicle body portion, and a second portion configured for attachment to a second vehicle body portion.

In another aspect of the embodiments of the present invention, a sub-assembly for a vehicle is provided. The sub-assembly includes a first portion of the body of the vehicle, and a node attached to the first body portion and configured for attachment to a second portion of the body of the vehicle.

BRIEF DESCRIPTION OF THE DRAWINGS

FIG. 3 is an edge view of the node shown in FIG. 1.

FIG. 4 is view of a second side of the node shown in FIG. 1, opposite the first side.

DETAILED DESCRIPTION

Figures 1, 2:
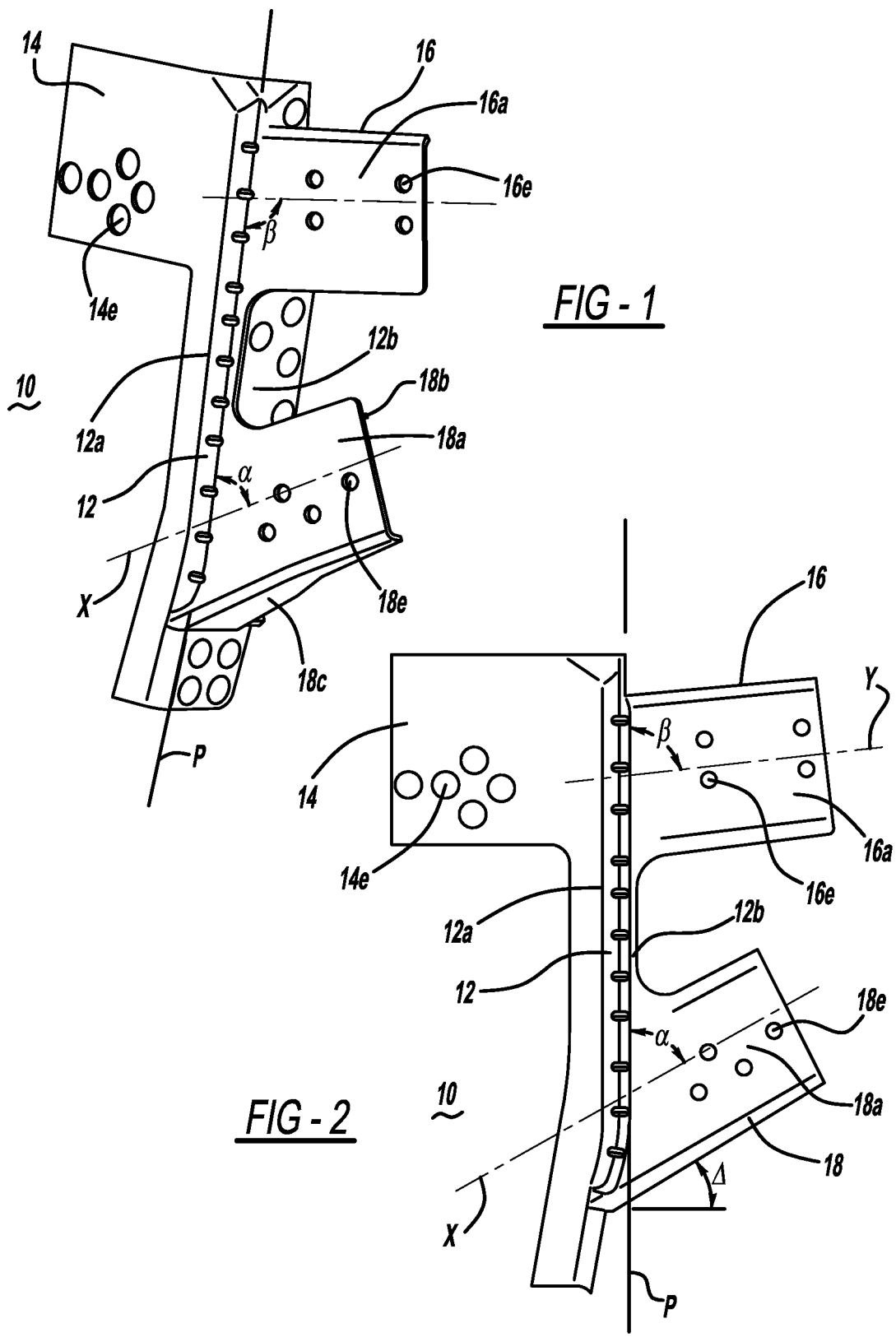
FIG. 1 is a perspective view of a node in accordance with one embodiment of the present invention.
FIG. 2 is a view of a first side the node shown in FIG. 1.

As used herein, the term "node" is defined as an element at which and by which two or more vehicle body portions are connected. A node in accordance with an embodiment of the present invention is a part separate from any of the connected components.

A node in accordance with an embodiment of the present invention generally includes a first portion configured for attachment to a first vehicle body portion, and a second portion configured for attachment to a second vehicle body portion. FIGS. 1-4 show one particular embodiment of a node 10 configured for connecting body portions of a vehicle. Node 10 has a base portion 12, a first projection 14 extending from the base portion and configured for attachment to a first vehicle body portion, a second projection 18 extending from the base portion and configured for attachment to a second vehicle body portion different from the first body portion, and a third projection 16 extending from the base portion. In the embodiment shown in FIGS. 1-4, third projection 16 is also configured for attachment to the second vehicle body portion. However, third projection 16 may alternatively be configured for attachment to the first body portion or to a third vehicle body portion different from the first and second body portions.

In the embodiment shown in FIGS. 1-4, first projection 14 extends from a first side 12a of the base portion while second and third projections 18 and 16 extend from a second side 12b of the base portion. In a particular embodiment, the first and second sides 12a and 12b of the base portion are opposite sides of the base portion. However, the base portion 12 may have any number of sides needed for a particular application.

Second projection 18 has a first wall portion 18a extending from the base portion 12, a second wall portion 18b extending from wall portion 18a, and a third wall portion 18c extending from wall portion 18a opposite second wall portion 18b. As seen in FIGS. 1-4, second and third wall portions 18b and 18c may also be joined with and extend from base portion 12. In a particular embodiment, wall portions 18b and 18c are generally parallel and wall portions 18a, 18b, and 18c in combination define a cavity 18d configured for receiving therein a portion of a vehicle body. In the embodiment shown in FIGS. 1-4, cavity 18d extends along an axis X forming an angle α with a plane P defined by base portion second side 12b. In a particular embodiment, the angle α is in the range of 30 to 90 degrees. If desired, a locating structure (not shown) configured for receiving and positioning the vehicle body portion to be connected to second projection 18 may be formed by first wall portion 18a and only one of adjacent wall portions 18b or 18c extending from the base portion 12. In alternative embodiments, one or more of wall portions 18a, 18b, or 18c could be omitted. Then, the surface for connecting the projection to an associated vehicle body portion would be provided by the remaining wall portion or portions.

In a particular embodiment where wall portions 18b and 18c are parallel, axis X is defined by a line extending perpendicular to a line L1 which is perpendicular to both a plane defined by wall portion 18b and a plane defined by wall portion 18b. In this embodiment, the axis X also extends through a midpoint of line L1 to intersect the plane P defined by base portion surface 12b.

Third projection 16 has a first wall portion 16a extending from the base portion 12, a second wall portion 16b extending from wall portion 16a, and a third wall portion 16c extending from wall portion 16a opposite second wall portion 16b. As seen in FIGS. 1-4, second and third wall portions 16b and 16c may also be joined with and extend from base portion 12. In a particular embodiment, wall portions 16b and 16c are generally parallel and wall portions 16a, 16b, and 16c in combination define a cavity 16d configured for receiving therein a portion of a vehicle body. In the embodiment shown in FIGS. 1-4, cavity 16d extends along an axis Y forming an angle β with the plane P defined by base portion second side 12b. In a particular embodiment, the angle β is in the range of 30 to 90 degrees. If desired, a locating structure (not shown) configured for receiving and positioning the vehicle body portion to be connected to third projection 16 may be formed by first wall portion 16a and only one of adjacent wall portions 16b or 16c extending from the base portion 12. In alternative embodiments, one or more of wall portions 16a, 16b, or 16c could be omitted. Then, the surface for connecting the projection to an associated vehicle body portion would be provided by the remaining wall portions.

In a particular embodiment where wall portions 16b and 16c are parallel, axis Y is defined by a line extending perpendicular to a line L2 which is perpendicular to both a plane defined by wall portion 16b and a plane defined by wall portion 16b. In this embodiment, the axis Y also extends through a midpoint of line L2 to intersect the plane P defined by base portion surface 12b.

In the embodiment shown in FIGS. 1-4, first projection 14 is planar. However, in alternative embodiments, first projection 14 may have a structure similar to second or third projections 18 and 16, as described above. In such embodiments, an angle θ (not shown) would be formed between a plane defined by base portion first side 12a and an axis T (not shown) of a cavity defined by wall portions of first projection 14, as previously described.

Alternative embodiments may have more than three projections or less than three projections extending from the base portion, according to the connection requirements of a particular application. Also, the particular angular relationships between the base portion 12 and any projections extending therefrom may be determined by such factors as the structure(s) of the vehicle body parts to be connected by the node and the spatial relationships between the vehicle body parts to be connected.

In the embodiment shown in FIGS. 1-4, first wall portion 18a intersects one or more of wall portions 18b and 18c. In a particular embodiment, first wall portion 18a intersects one or more of wall portions 18b and 18c to form right angles with the wall portion(s). Also, in the embodiment shown in FIGS. 1-4, first wall portion 16a intersects one or more of wall portions 16b and 16c. In a particular embodiment, first wall portion 16a intersects one or more of wall portions 16b and 16c to form right angles with the wall portion(s).

In the embodiment shown in FIGS. 1-4, one or more through holes 18e are formed in first wall portion 18a of second projection 18 to facilitate attachment of the vehicle body portion to the second projection 18 of node 10 using, for example, rivets (where a permanent connection between the node and the body portion is desired) or removable mechanical fasteners (in an embodiment where the body portion is to be detachably or removably connected to the vehicle body portion). In addition, one or more through holes 14e are formed in first projection 14 to facilitate connection between the first projection and a portion of the vehicle body in the manner described above. Similarly, one or more through holes 16e are formed in third projection 16 to facilitate connection between the second projection and a portion of the vehicle body in the manner described above. Alternatively, the node 10 (and the vehicle body portion to be connected to the node) may be provided with features which facilitate attachment of the parts using other methods, such as welding or adhesive application, for example.

As previously described, the various wall portions of the projections 14, 16, and 18 define respective cavities configured to receive and engage therein an associated body portion of a vehicle. The vehicle body portion inserted into any cavity may contact any of the projection wall portions defining that cavity along the entire extent of the wall portion or along any part of the wall portion. In addition, any of the wall portions may have indentations, ribs, or other features incorporated therein and configured to contact the associated vehicle body portion when the body portion is inserted into the cavity. In such embodiments, the wall portion may include a base and one or more vehicle body portion contact elements extending from or otherwise coupled to the base and configured for contacting the associated vehicle body portion. For example, in FIG. 4, a rib 500 extends along an interior surface of second projection wall portion 18c so as to contact the vehicle body portion received in the cavity and so as to space the vehicle body portion away from at least a portion of the base. In the embodiment shown, rib 500 is also connected to wall portion 18a and serves to strengthen wall portion 18c. Thus, in the particular embodiment shown in FIG. 4, wall portion 18c includes a base 18c-1 and a vehicle body portion contact element (in the form of rib 500) extending from the base 18c-1.

Node 10 may be formed in a single piece or the node may be formed from one or more components which are joined using any suitable method, for example, welding or riveting. In one embodiment, node 10 is cast in a single piece from a suitable metallic material (for example AURAL-2® die cast alloy) and finish machined where necessary. However, node 10 may be formed from any suitable material or materials, using any suitable process or processes.

Embodiments of the node described herein are configured to be detachably connected to at least one of the vehicle body portions to which they are coupled. A detachable connection between the node and a complementary vehicle body portion may be made using removable mechanical fasteners or any other method which permits separation of the node and the connected body portion without, as a result of the separation, destroying or damaging either the node or the body portion such that the node or body portion could not be similarly re-attached to another complementary node or body portion.

In a particular embodiment, the node 10 is detachably connected to a first vehicle body portion and permanently connected to another vehicle body portion. The connection between the node and the body portion is understood to be "permanent" when it is not detachable, as described above. Various types of known attachment methods (for example, welding) may be used to provide such a permanent connection.

In another particular embodiment, the node 10 is detachably connected to all of the vehicle body portions attached thereto.

Figure 5:
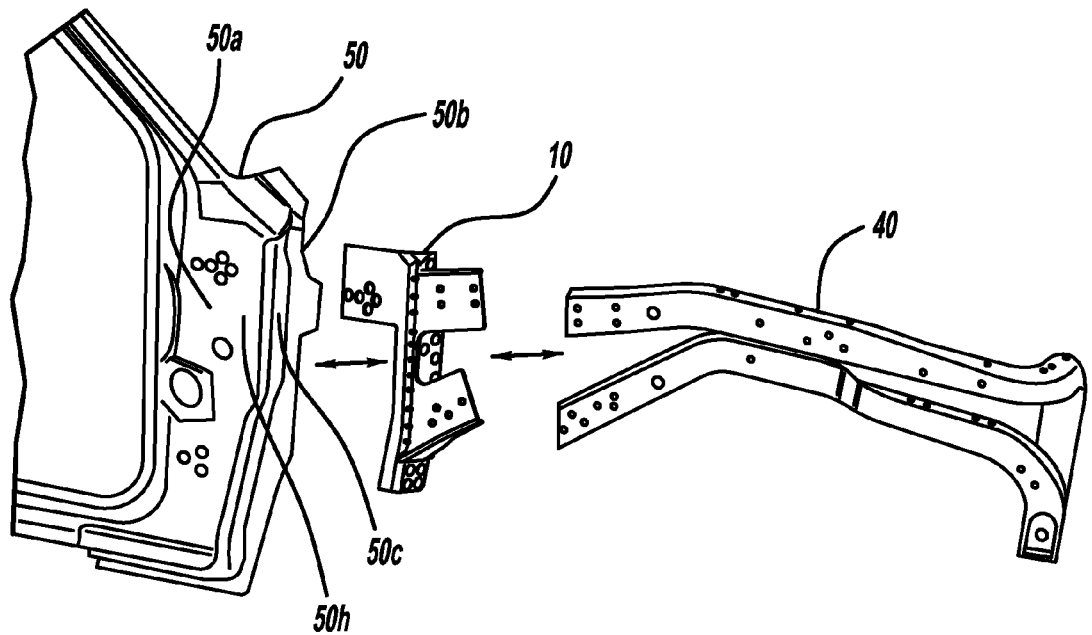
FIG. 5 is an exploded view of a vehicle assembly including anode in accordance with an embodiment of the present invention and a pair of vehicle body portions connectable by the node.
Figure 6:
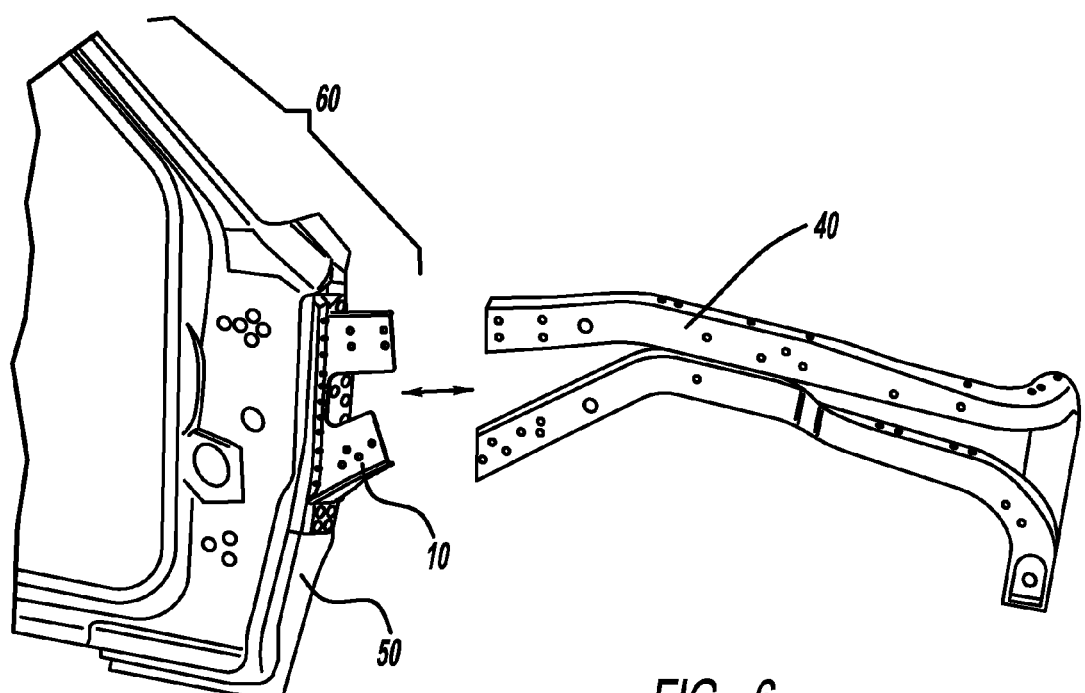
FIG. 6 is an exploded view of a first embodiment of a vehicle sub-assembly incorporating a connecting node, and a vehicle body portion connectable to the sub-assembly.
Figure 7:
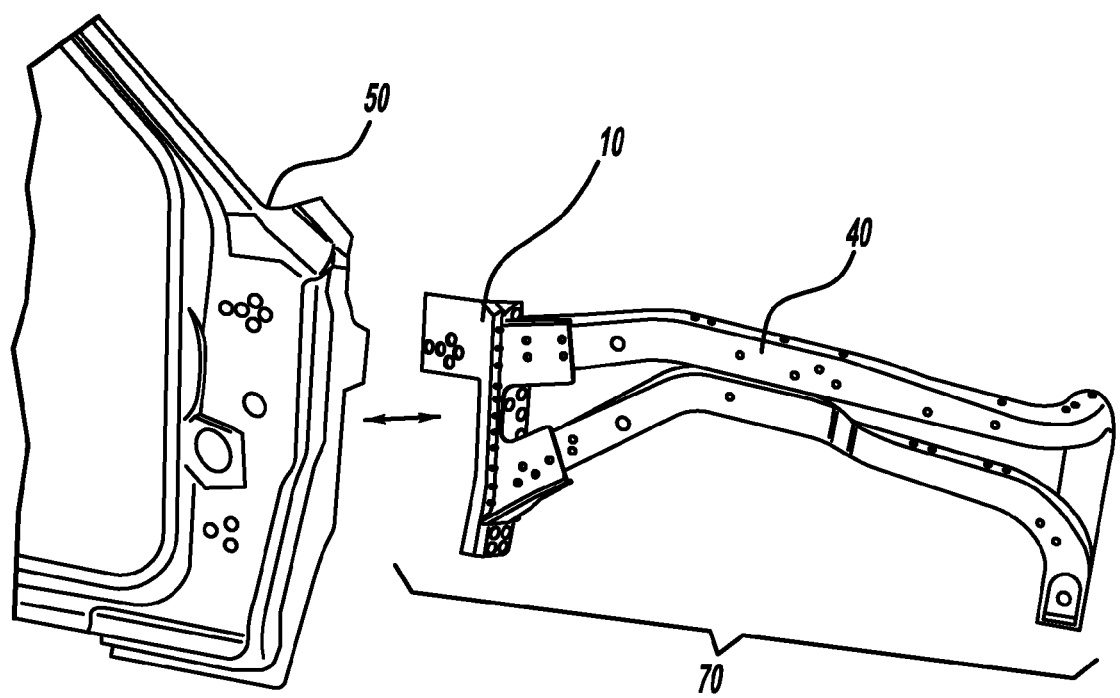
FIG. 7 is an exploded view of a second embodiment of a vehicle sub-assembly incorporating a connecting node, and a vehicle body portion connectable to the sub-assembly.

Referring to FIGS. 5-7, in the particular embodiment shown, the node 10 connects a tubular vehicle front end structure (generally designated 40) to another component of the vehicle body. In a particular embodiment, front end structure 40 is connected via the node 10 to a hinge pillar 50 for a door of the vehicle. Thus, this embodiment of the node permits a tubular component or structure (in this case, the vehicle front end structure) to be connected to a stamped component or structure (in this case, the door hinge pillar). Embodiments of the node enable connection between vehicle body portions along exterior surfaces of the body portions.

Referring to FIGS. 5-7, in a particular embodiment, the node is also configured to serve as a structural reinforcement for the vehicle door hinge pillar 50, thereby obviating the need for a reinforcing component separate from the node and the hinge pillar. In this configuration, the hinge pillar 50 comprises an inner panel 50a and an outer panel 50b attached to the inner panel 50a. The inner and outer panels 50a and 50b are shaped so that a section 50h of the inner panel 50a overlaps an adjacent portion of the outer panel 50b to form a pocket or cavity 50c between the panels when the panels are affixed to each other. In this embodiment, node first projection 14 extends into cavity 50c and is attached to one or more of the inner and outer panels using rivets (for a permanent connection), removable threaded fasteners (for a removable connection), or any other suitable method. In a particular embodiment, the node 10 is permanently mounted in the cavity 50c using rivets. Nested within the cavity 50c and secured to one or more of panels 50a and 50b, the node first projection 14 increases the effective cross-sectional area of the hinge pillar, thereby increasing the resistance of the hinge pillar to deformation due to forces applied during impact or rollover events.

Referring to FIG. 6, an embodiment of node 10 may be attached to the hinge pillar 50 to form a vehicle sub-assembly 60 including the node 10 and the hinge pillar 50.

Referring to FIG. 7, an embodiment of node 10 may be attached to the tubular front end structure 40 to form a vehicle sub-assembly 70 including the node 10 and the on end structure 40.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A node structured to connect body portions of a vehicle, the node comprising:
   a planar base portion having a first side and a second side opposite the first side;
   a first projection extending from the first side and structured for attachment to a vehicle body;
   a second projection extending from the second side and structured for attachment to a vehicle body portion; and
   a third projection extending from the second side and structured for attachment to a vehicle body portion,
   wherein the first projection extends from the base portion along a plane extending perpendicular to a plane along which the planar base portion extends.

2. The node of claim 1 wherein the second projection extends from the base portion along a plane extending perpendicular to a plane along which the base portion extends.

3. A node structured to connect body portions of a vehicle, the node comprising:
   a planar base portion having a first side and a second side opposite the first side;
   a first projection extending from the first side and structured for attachment to a vehicle body;
   a second projection extending from the second side and structured for attachment to a vehicle body portion; and
   a third projection extending from the second side and structured for attachment to a vehicle body portion,
   wherein the third projection extends from the base portion along a plane extending perpendicular to a plane along which the base portion extends.

4. The node of claim 1 wherein the first projection is planar and has a first face and a second face opposite the first face.

5. The node of claim 1 wherein the second projection extends along a longitudinal axis, the third projection extends along a longitudinal axis, and wherein the axes extend from the base portion so as to converge at a distance from the base portion.

6. A node structured to connect body portions of a vehicle, the node comprising:
   a planar base portion having a first side and a second side opposite the first side;
   a first projection extending from the first side and structured for attachment to a vehicle body;
   a second projection extending from the second side and structured for attachment to a vehicle body portion; and
   a third projection extending from the second side and structured for attachment to a vehicle body portion,
   wherein the first projection is configured for removable attachment to the vehicle body portion.

7. A node structured to connect body portions of a vehicle, the node comprising:
   a planar base portion having a first side and a second side opposite the first side;
   a first projection extending from the first side and structured for attachment to a vehicle body;
   a second projection extending from the second side and structured for attachment to a vehicle body portion; and
   a third projection extending from the second side and structured for attachment to a vehicle body portion,
   wherein the second projection has a first wall portion extending from the base portion, a second wall portion extending from the first wall portion, and a third wall portion extending from the first wall portion opposite the second wall portion, the wall portions combining to define a cavity structured for receiving therein a portion of a vehicle body portion.

8. The node of claim 7 wherein the cavity extends along an axis forming an angle with a plane defined by the base portion second side.

9. The node of claim 7 wherein the third projection has a first wall portion extending from the base portion, a second wall portion extending from the first wall portion, and a third wall portion extending from the first wall portion opposite the second wall portion, the wall portions combining to define a cavity structured for receiving therein a portion of a vehicle body.

* * * * *